(12) United States Patent
Gershon et al.

(10) Patent No.: US 12,455,369 B2
(45) Date of Patent: Oct. 28, 2025

(54) SYSTEM AND METHOD FOR AVOIDING UTILITY STRIKES BY CONSTRUCTION EQUIPMENT

(71) Applicant: RodRadar Ltd., Rinatya (IL)

(72) Inventors: Yossi Gershon, Mazor (IL); Ronen Globinsky, Tel Aviv (IL); John Francis Roulston, Edinburgh (GB); Moshe Dalman, Mazor (IL)

(73) Assignee: RodRadar Ltd., Rinatya (IL)

( * ) Notice: Subject to any disclaimer, the term of this patent is extended or adjusted under 35 U.S.C. 154(b) by 252 days.

(21) Appl. No.: 18/183,985

(22) Filed: Mar. 15, 2023

(65) Prior Publication Data
US 2023/0296755 A1    Sep. 21, 2023

Related U.S. Application Data

(60) Provisional application No. 63/321,787, filed on Mar. 21, 2022.

(51) Int. Cl.
| | | |
|---|---|---|
| *G01S 13/88* | (2006.01) | |
| *E02F 9/24* | (2006.01) | |
| *E02F 9/26* | (2006.01) | |
| *G01S 7/41* | (2006.01) | |
| *G01S 13/04* | (2006.01) | |

(52) U.S. Cl.
CPC ............ *G01S 13/885* (2013.01); *E02F 9/245* (2013.01); *E02F 9/261* (2013.01); *G01S 7/41* (2013.01); *G01S 13/04* (2013.01)

(58) Field of Classification Search
CPC .......... G01S 13/885; G01S 7/41; G01S 13/04; E02F 9/245; E02F 9/261; G01V 3/12
See application file for complete search history.

(56) References Cited

U.S. PATENT DOCUMENTS

| | | | |
|---|---|---|---|
| 6,664,914 B2 | 12/2003 | Longstaff | |
| 9,899,741 B2 | 2/2018 | Roulston | |
| 10,067,225 B1 * | 9/2018 | Sentelle | .................. G01S 13/32 |
| (Continued) | | | |

FOREIGN PATENT DOCUMENTS

| | | | |
|---|---|---|---|
| CN | 111962602 A | 11/2020 | |
| EP | 3477330 A1 | 5/2019 | |
| (Continued) | | | |

OTHER PUBLICATIONS

18183985_2025-03-28_WO_2018099755_A1_M.pdf, machine translation of WO-2018099755-A1 (Year: 2018).*

(Continued)

*Primary Examiner* — William Kelleher
*Assistant Examiner* — Kenneth W Good
(74) *Attorney, Agent, or Firm* — Heidi Brun Associates Ltd.; Heidi M. Brun (57) ABSTRACT

A GPR (ground penetrating radar) system includes a digging machine having a bucket, a GPR unit and a post-processing unit. The GPR unit is mounted on the bucket and includes at least one GPR antenna and a data processor. Both the at least one antenna and the data processor are mounted within the bucket. The data processor detects a presence of a hazard during a progressive removal of layers of soil. The post-processing unit is installed in a cabin of the digging machine and provides an alert when the data processor detects the hazard during the removal of soil.

28 Claims, 9 Drawing Sheets

(56) References Cited

U.S. PATENT DOCUMENTS

| | | | |
|---|---|---|---|
| 11,085,170 B2 | 8/2021 | Roulston | |
| 11,280,881 B2 | 3/2022 | Conway | |
| 11,492,777 B2 | 11/2022 | Kurokawa | |
| 11,502,416 B2 | 11/2022 | Conway | |
| 2016/0195607 A1* | 7/2016 | Roulston | G01S 13/106 |
| | | | 342/201 |
| 2019/0101641 A1* | 4/2019 | Hogan | G01S 13/88 |
| 2019/0129001 A1 | 5/2019 | Conway | |
| 2021/0209800 A1* | 7/2021 | Atsumi | H04N 13/246 |
| 2022/0018931 A1* | 1/2022 | Kumar | G01S 7/10 |

FOREIGN PATENT DOCUMENTS

| | | | | |
|---|---|---|---|---|
| GB | 2486375 A | 6/2012 | | |
| WO | WO-2018099755 A1 * | 6/2018 | | G01C 15/002 |
| WO | 2022046388 A1 | 3/2022 | | |

OTHER PUBLICATIONS

International Search Report for corresponding PCT application PCT/IL2023/050275 mailed on Jul. 18, 2023.
English translation of CN 111962602 downloaded from Google Patents on Jul. 19, 2023.
Exploration Seismology, by Sheriff and Geldart, Cambridge University Press, ISBN 0-521-48626-4 (Lib. of Congress).

* cited by examiner

FIG. 5A — CONVENTIONAL ANTENNA RESPONSE WITH RINGING

FIG. 5B — DIGITALLY CORRECTED ANTENNA RESPONSE

SYSTEM AND METHOD FOR AVOIDING UTILITY STRIKES BY CONSTRUCTION EQUIPMENT

CROSS-REFERENCE TO RELATED APPLICATIONS

This application claims priority from U.S. provisional patent application 63/321,787, filed Mar. 21, 2022, which is incorporated herein by reference.

FIELD OF THE INVENTION

The present invention relates to construction equipment generally and to sensing systems for construction equipment in particular.

BACKGROUND OF THE INVENTION

In the construction industry, utility strikes (i.e., construction equipment hitting and often breaking underground utility services) are frequent and cause significant direct and indirect costs. This is particularly common when digging in or between built-up areas, which might have gas mains, underground electricity cables, and/or fibre-optic cables, among others. Strikes on gas mains and underground electricity cables are hazardous to life and property. Strikes on fibre-optic cables are very expensive to repair and often incur loss of communications for a significant amount of time, which may have a follow-on effect on many types of services that depend on the communications.

Unfortunately, none of the known methods for detecting underground utilities are effective. Acoustic methods have failed to detect utilities. Magnetometers detect ferrous metal pipes but are unreliable and subject to misinterpretation. Active methods involving injecting electric current and the subsequent detection of electric and magnetic fields depend on conductive continuity, which is not always guaranteed. In addition, they require experience to operate and are generally deemed unreliable.

Live electrical power cables may be detected by their magnetic field, though less so for armoured cables where the armour shields the field.

Ground Penetrating Radar (GPR) is the most universal detection method because it detects a material discontinuity regardless of the nature of the material. That is, it detects all metals, all plastics, ceramics and even voids. Cables are detected independently of whether or not they are energised. GPR can detect fibre optic cables and most especially, the high traffic fibre optic cables used in city-to-city communications, where breakage incurs the most significant costs.

However, in conventional use, GPR requires a pre-site survey for locating utilities and involves off-line map preparation and harmonisation of the map with reference markers placed on the site. Since harmonisation between the radar map and the site reference is usually poor and since the interpretation of the GPR images requires considerable expertise, conventionally applied GPR is impractical in many situations.

GB 2486375 to John Deere describes an antenna to be placed onto the teeth of a bucket of a digging machine, such that the beam exit is in line with the bucket teeth. Such a beam direction is not effective for detecting utilities while in the process of digging.

SUMMARY OF THE PRESENT INVENTION

There is therefore provided, in accordance with a preferred embodiment of the present invention, a GPR (ground penetrating radar) system which includes a digging machine having a bucket, a GPR unit mounted on the bucket and a post-processing unit installed in a cabin of the digging machine. The GPR unit includes at least one GPR antenna mounted on and/or through a ground facing base of the bucket and a data processor mounted within an upper portion of the bucket. The data processor detects a presence of a hazard during a progressive removal of layers of soil. The post-processing unit provides an alert when the data processor detects the hazard during the progressive removal of layers of soil.

Moreover, in accordance with a preferred embodiment of the present invention, the data processor includes a radar controller to transmit and receive pulses in both a SFCW (stepped frequency continuous wave) manner and a SFICW (stepped frequency interrupted continuous wave) manner.

Further, in accordance with a preferred embodiment of the present invention, the data processor includes a tone calibrator to determine antenna deficiencies. Since the pulses are sequences of tones in a frequency domain, the data processor includes a pulse corrector to individually correct imperfections in the tones using output of the tone calibrator.

Moreover, in accordance with a preferred embodiment of the present invention, the tone calibrator corrects a ringing in the at least one GPR antenna.

Still further, in accordance with a preferred embodiment of the present invention, the data processor includes a sequence migration unit receiving corrected pulses from the pulse corrector to migrate echo energy in the corrected pulses to a point of maximum likelihood indicating a location of the hazard.

Moreover, in accordance with a preferred embodiment of the present invention, the at least one antenna points earthwards while the bucket is scooping earth.

Further, in accordance with a preferred embodiment of the present invention, the at least one antenna is designed to survive rigors of a digging environment.

Still further, in accordance with a preferred embodiment of the present invention, the at least one GPR antenna is installed within a volume of the bucket.

Moreover, in accordance with a preferred embodiment of the present invention, the data processor includes an IMU (inertial measurement unit) and a Kalman filter. The Kalman filter estimates horizontal location of the bucket using constrained motion of the bucket.

Further, in accordance with a preferred embodiment of the present invention, the data processor includes a start point determiner to establish a datum from which horizontal and vertical coordinates of a utility scatterer are measured.

Still further, in accordance with a preferred embodiment of the present invention, the alert is a displayed alert and/or an audible alert.

Moreover, in accordance with a preferred embodiment of the present invention, the post-processing unit includes a GPS unit to geo-locate a site of the digging machine. The post-processing unit includes location data from the GPS unit in a log of the removal of layers of soil.

Further, in accordance with a preferred embodiment of the present invention, the system includes a communications unit to relay a location of the hazard and the location data to an external agent.

Still further, in accordance with a preferred embodiment of the present invention, the system includes at least one interface to receive control information from instrumentation for operator assistance or autonomous operation.

Alternatively, in accordance with an alternative preferred embodiment of the present invention, the system also includes an emitter and multiple receivers. The emitter is mounted on a stick of the digging machine near a pivot between the stick and the bucket. The multiple receivers are mounted within the cabin to receive signals from the emitter. The data processor determines horizontal position of the bucket at least from time-of-flight measurements between the emitter and the receivers.

Further, in accordance with a preferred embodiment of the present invention, the emitter and the multiple receivers implement one of the following technologies: ultrasonics, UWB radar, millimeter wave radar, and optics.

Still further, in accordance with a preferred embodiment of the present invention, the system includes an inclinometer to measure an inclination of the bucket from horizontal. The data processor utilizes the inclination to determine the horizontal position.

There is also provided, in accordance with a preferred embodiment of the present invention, a method for GPR systems. The method includes detecting a presence of a hazard during a progressive removal of layers of soil using a GPR unit mounted on a bucket of a digging machine, where the GPR unit includes at least one GPR antenna mounted on and/or through a ground facing base of the bucket and a data processor mounted within an upper portion of the bucket, and providing an alert when the data processor detects the hazard during the progressive removal of layers of soil.

Moreover, in accordance with a preferred embodiment of the present invention, the detecting includes transmitting and receiving pulses in both a SFCW (stepped frequency continuous wave) manner and a SFICW manner.

Further, in accordance with a preferred embodiment of the present invention, the pulses are sequences of tones in a frequency domain and the detecting includes determining antenna deficiencies and individually correcting imperfections in the tones using output of the determining. The determining includes correcting a ringing in the at least one GPR antenna.

Still further, in accordance with a preferred embodiment of the present invention, the detecting includes receiving corrected pulses and migrating echo energy in the corrected pulses to a point of maximum likelihood indicating a location of the hazard.

Moreover, in accordance with a preferred embodiment of the present invention, the method includes pointing the at least one GPR antenna earthwards while the bucket is scooping earth.

Further, in accordance with a preferred embodiment of the present invention, the method includes installing the at least one GPR antenna within a volume of the bucket.

Moreover, in accordance with a preferred embodiment of the present invention, the detecting includes estimating horizontal location of the bucket with a Kalman filter using constrained motion of the bucket and output of an IMU (inertial measurement unit).

Further, in accordance with a preferred embodiment of the present invention, the detecting includes establishing a datum from which horizontal and vertical coordinates of a utility scatterer are measured.

Still further, in accordance with a preferred embodiment of the present invention, the method includes geo-locating a site of the digging machine and including the location data from the geo-locating in a log of the removal of layers of soil.

Moreover, in accordance with a preferred embodiment of the present invention, the method includes relaying a location of the hazard and the location data to an external agent.

Further, in accordance with a preferred embodiment of the present invention, the method includes receiving control information from instrumentation for operator assistance or autonomous operation.

Alternatively, in accordance with an alternative preferred embodiment of the present invention, the detecting includes determining horizontal position of the bucket at least from time-of-flight measurements between an emitter mounted on a stick of the digging machine near a pivot between the stick and the bucket and multiple receivers mounted within the cabin receiving signals from the emitter.

Finally, in accordance with a preferred embodiment of the present invention, the method includes measuring an inclination of the bucket from horizontal, the detecting to utilize the inclination to determine the horizontal position.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that a GPR system which integrates detection below the bucket with the action of digging can replace off-line survey and interpretation and may make application of GPR practical as protection against utility breakage. This may provide a safer way to dig.

Figure 1A:
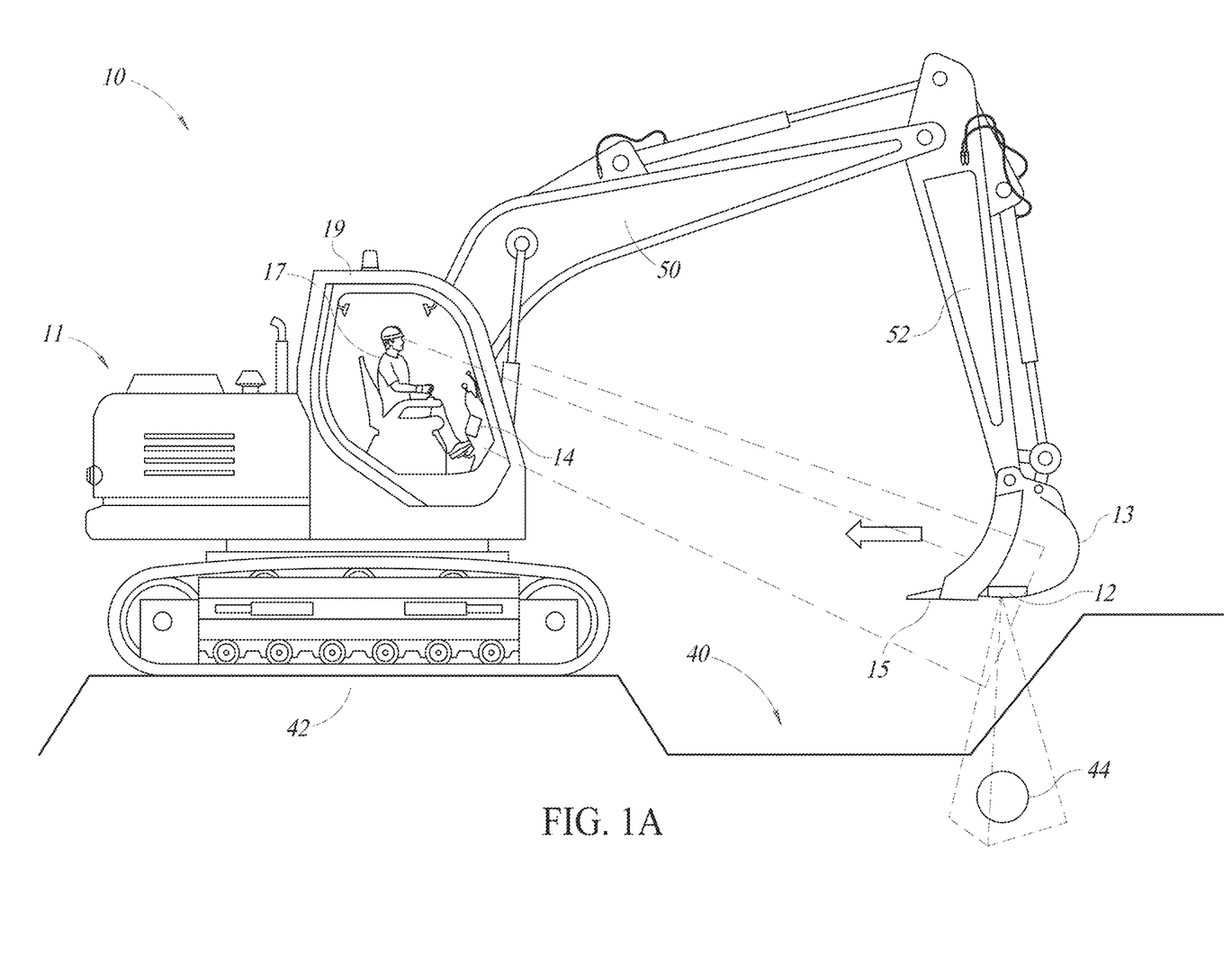
FIGS. 1A, 1B and 1C are schematic illustrations together showing a GPR system operative during a digging operation with a digging machine.
Figure 1B:
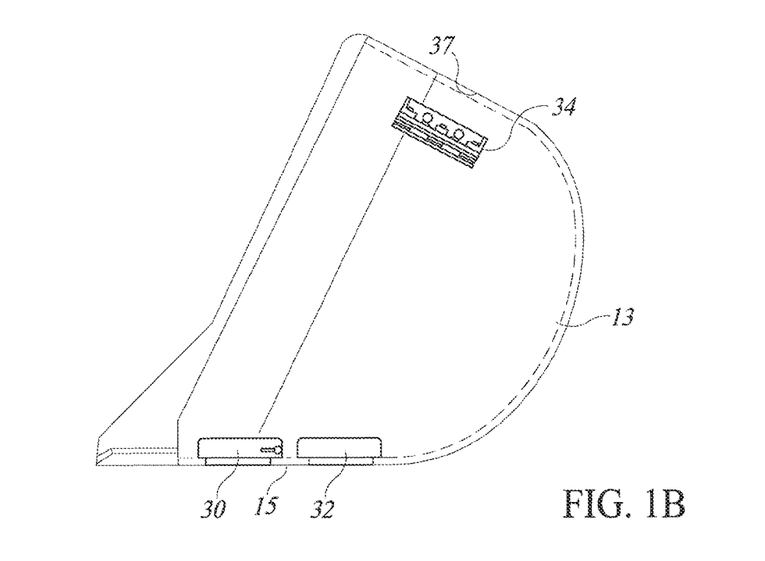
Figure 1C:
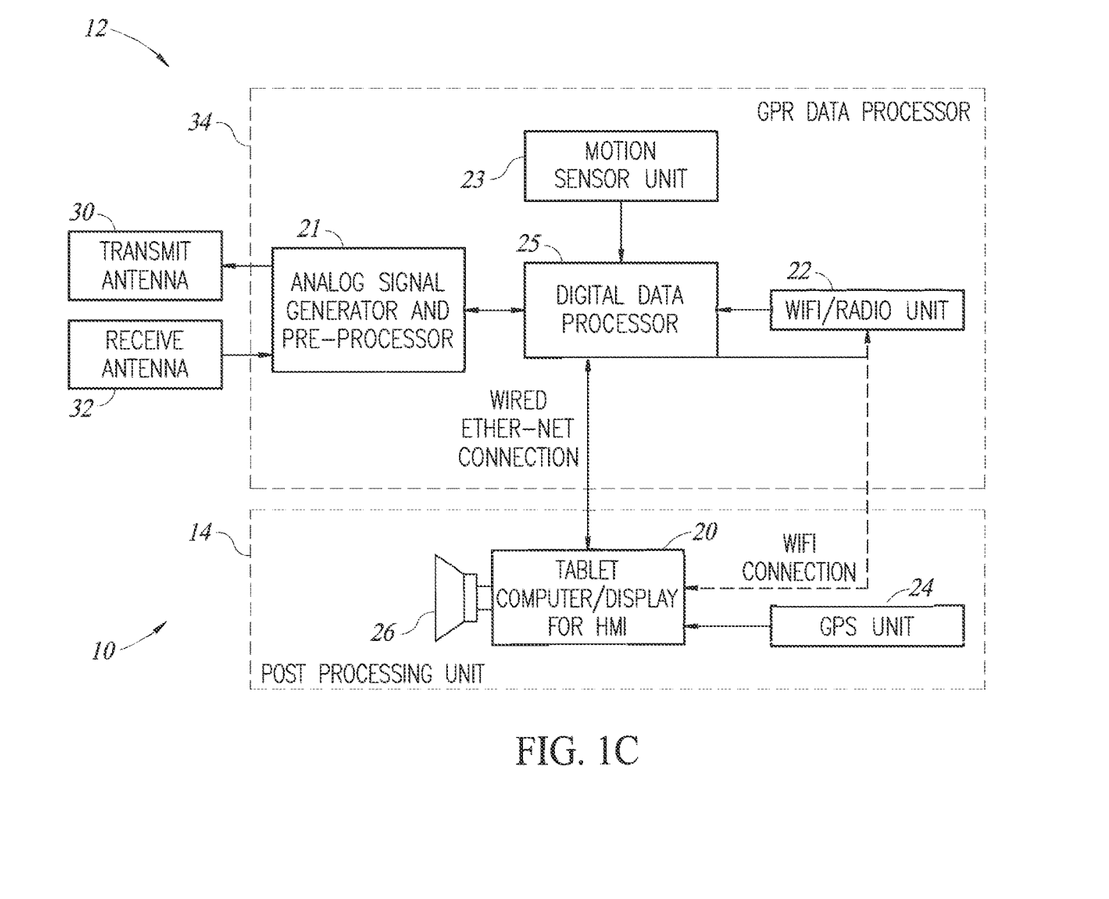

Reference is now made to FIGS. 1A, 1B and 1C which together illustrate a GPR system 10 operative during a digging operation with a digging machine 11. GPR system 10 comprises a GPR unit 12 attached to a digging bucket 13 of a digging machine or "digger" 11, and a post-processing unit 14 installed in a cabin 19 where an operator 17 may sit while operating digger 11. Digger 11 may be any suitable excavator, such as a backhoe, a loader, a bulldozer, a grader, or any other digging type of construction vehicle.

GPR unit 12 may comprise a transmit antenna 30, a receive antenna 32, and a GPR data processor 34, all mounted within the volume of bucket 13. Antennas 30 and 32 may be mounted on, within and/or through a ground facing base 15 (FIG. 1B) of bucket 13. FIG. 1B shows exemplary antennas 30 and 32 which are mounted such that a portion of them extend through base 15 and a portion sits on an inner surface of base 15. GPR data processor 34 may be mounted on an upper portion 37 of bucket 13. GPR data processor 34 may be isolated from bucket 13 against shock and vibration, such as by shock absorbers (not shown), and may be powered from digger 11.

GPR data processor 34 may comprise an analog signal generator and pre-processor 21 (FIG. 1C), a motion sensor unit 23, a digital data processor 25, and a radio communication unit 22, such as a WiFi unit or a radio device for cellular connection. Post-processing unit 14 may comprise a display 20, such as a monitor or a tablet computer, in radio communication with radio communication unit 22, a GPS unit 24, and a speaker 26, for alerting operator 17. Display 20 may include a menu system and touch sensing.

Transmit antenna 30 and receive antenna 32 may be any suitable GPR antenna pair, which can survive the rigors of the digging environment, such as the one described in U.S. Pat. No. 9,899,741 and in U.S. patent application Ser. No. 17/259,170, filed in the PCT on Jul. 18, 2019 and issued as U.S. Pat. No. 11,502,416 on Nov. 15, 2022, all assigned to the Applicant of the present invention and incorporated in their entirety herein by reference. GPR data processor 34 may control antennas 30 and 32, may process the GPR data received from receive antenna 32 and may review the processed data to determine if a hazard (i.e., a utility) has been detected. If so, it may generate a visual alert to be displayed on display 20, and/or an audio alert for speaker 26, to indicate to operator 17 to stop digging and investigate.

In addition, GPR data processor 34 may receive geolocation information of digger 11 from GPS unit 24. GPR data processor 34 may log the dig data, may associate it at least with the geo-position of digger 11 and may relay it, via radio communication unit 22, to display 20. In addition, GPR data processor 34 may relay the geo-position to a computerised archive (not shown) storing evidence of the dig and/or to a central control unit for review by the construction team.

FIG. 1A illustrates the basic process of digging a trench 40. Digger 11 may stand in a location 42 and operator 17 may use bucket 13 to dig trench 40. Operator 17 may move bucket 13 horizontally to sequentially remove layers of material from trench 40. In accordance with a preferred embodiment of the present invention, operator 17 may be instructed to maintain base 15 of bucket 11 horizontal, either manually or with computer-assisted control, during the digging of each layer. This may maintain a radar beam 44, issuing from GPR unit 12, vertical (i.e., detecting directly below and slightly ahead of bucket 13). It will be appreciated that radar beam 44 may move horizontally, with the horizontal motion of bucket 13, but may view the ground vertically, to detect what might be below the current layer of trench 40.

Applicant has realized that, since GPR unit 12 may look vertically into the ground below bucket 13, it may detect any utilities that are several layers below the layer currently being removed. Moreover, Applicant has realized that the initial detection may be unclear, given that the utilities may be significantly below the current layer of ground, and given that the type of soil and the presence of moisture in the soil affect the quality of the detection. However, with each layer removed, the detection may significantly improve. This may enable a high-quality detection to occur well before bucket 13 may touch any hidden utilities.

Moreover, as discussed in U.S. Pat. No. 11,085,170, assigned to Applicant and incorporated in its entirety herein by reference, GPR data processor 34 may take advantage of the fact that the motion of bucket 13 when digging trench 40 is horizontal and thus, the rotation of a boom 50 and a stick 52 of digger 11 may happen in only one plane. As discussed in U.S. Pat. No. 11,085,170, this simplifies the calculations for the location of receive antenna 32 when using the motion of bucket 13, measured by motion sensor unit 23, as input. Using these calculations, GPR data processor 34 may determine the location of any detected utilities from the starting point of the dig. GPR data processor 34 may then provide the location information to display 20 and/or the computerised archive or to a central control unit for review by the construction team.

Figure 2A:
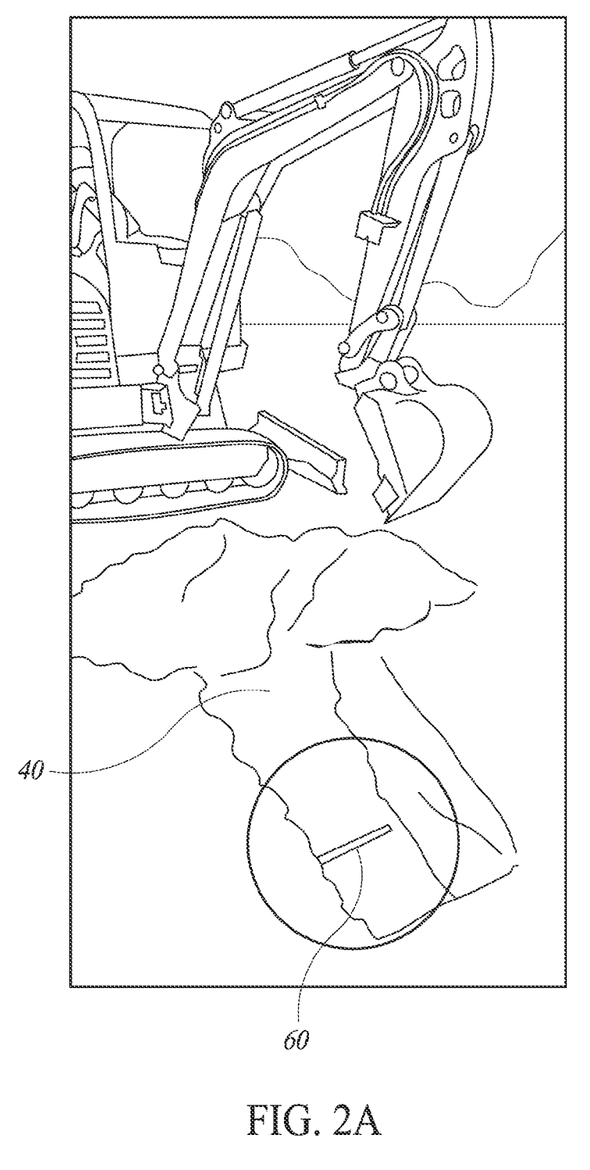
FIGS. 2A, 2B and 2C are schematic illustrations of a dug trench crossed by a buried utility, of a processing unit in an operator cabin and of a display, respectively, useful in understanding the GPR system of FIGS. 1A, 1B and 1C.
Figure 2B:
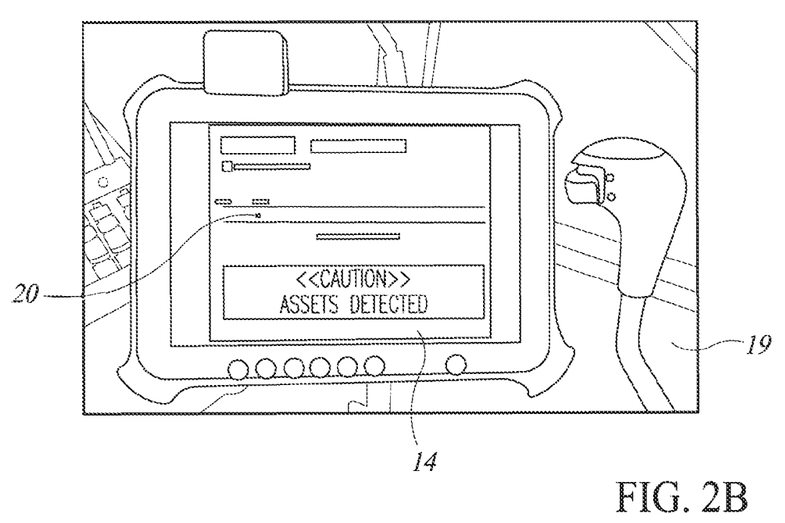
Figure 2C:
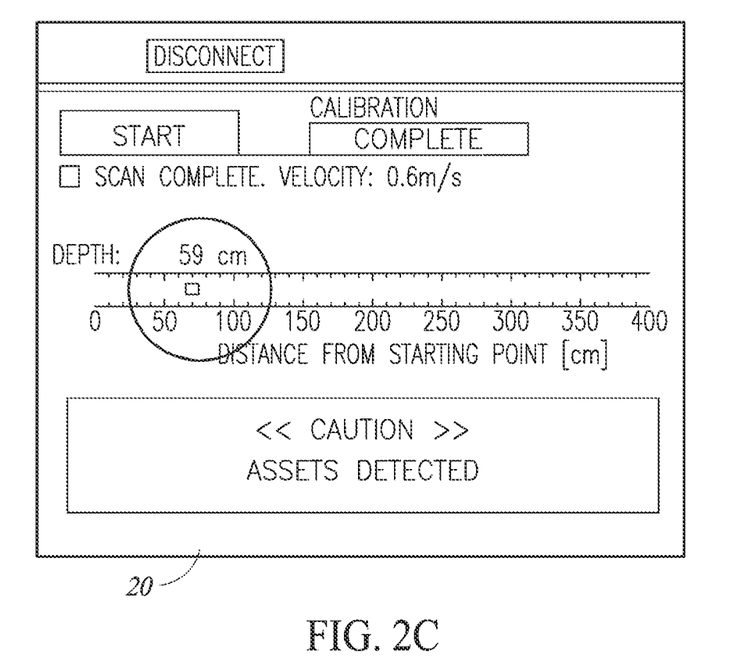

Reference is now briefly made to FIGS. 2A, 2B and 2C which are schematic illustrations of a dug trench 40 crossed by a buried utility 60, of processing unit 14 in cabin 19 and of a display 20 of processing unit 14, respectively. Note that display 20 has an alert on the screen in response to the detection of buried utility 60 and also shows the location, indicated as a distance from a starting point of trench 40, and the depth of buried utility 60.

Applicant has realized that, in order to automatically detect underground utilities in real-time (i.e., during digging), the data quality of GPR system 10 must be significantly more accurate than that currently provided by conventional GPRs, which transmit and receive pulses. Accordingly, analog signal generator and pre-processor 21 may, instead, generate a sequence of frequencies, which are the Fourier components of a short pulse, for transmission by transmit antenna 30. Analog signal generator and pre-processor 21 may receive, amplify and process the echo responses from the subterranean material. As described in more detail hereinbelow, analog signal generator and pre-processor 21 may construct the short pulse from its Fourier component echoes and, before finalizing the short pulse, may make corrections to the Fourier component echoes for the equipment imperfections incurred in the signal chain.

Figure 3:
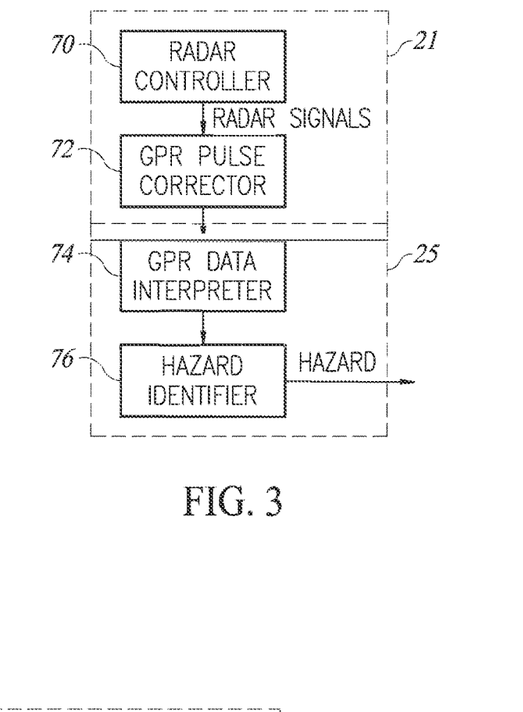
FIG. 3 is a block diagram illustration of an analog signal generator and pre-processor, useful in the GPR system of FIG. 1C.

Referring to FIG. 3, in an exemplary embodiment, analog signal generator and pre-processor 21 may comprise a radar controller 70 and a GPR pulse corrector 72, and digital data processor 25 may comprise a GPR data interpreter 74 and a hazard identifier 76.

Radar controller 70 may control the operations of antennas 30 and 32 and may activate antennas 30 and 32 to transmit and receive, respectively, the sequence of tones sequentially over an interval of approximately $\frac{1}{10}^{th}$ of a second. Between 100 and 400 tones, being simple continuous wave carriers of generally stepped frequencies, may be transmitted and the echo data stored. In one embodiment, the transmission may be synchronized using the principles described in U.S. patent application Ser. No. 16/163,799, filed Oct. 18, 2018 and issued as U.S. Pat. No. 11,280,881 on Mar. 22, 2022, assigned to Applicant and incorporated in its entirety herein by reference.

GPR pulse corrector 72 may correct any aberrations, as discussed hereinbelow, in the pulses in the radar signals to generate pulses which may be more accurate than those of conventional GPR systems. GPR data interpreter 74 may use the more accurate pulse data to detect buried utility 60 or other hazard and to determine its location from the starting point of trench 40. Hazard identifier 76 may alert digging operator 17 to the upcoming hazard.

Figure 4:
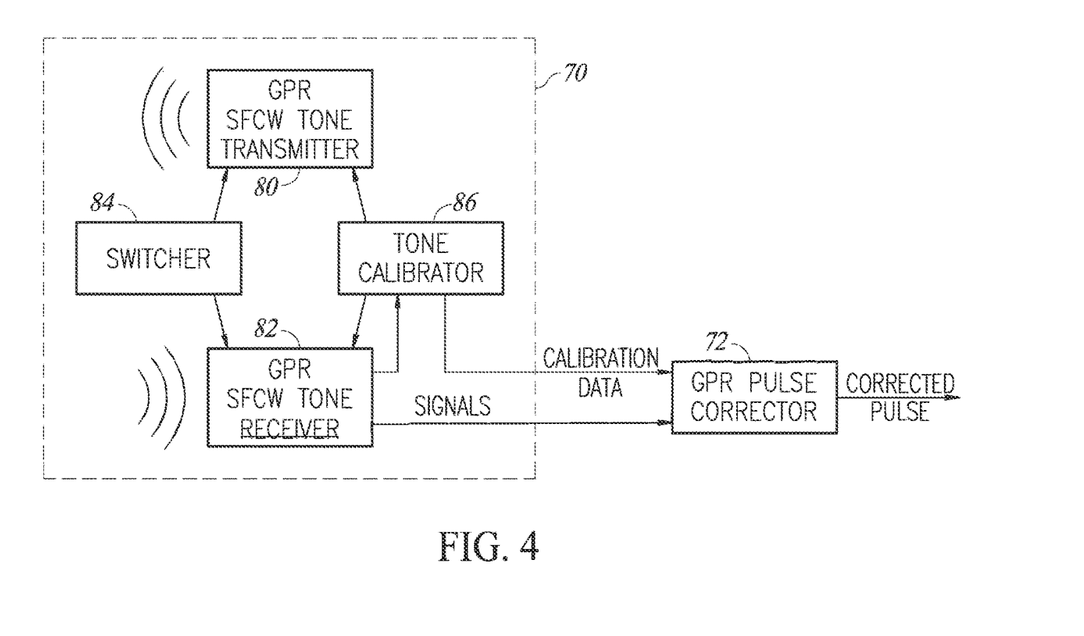
FIG. 4 is a block diagram illustration of a radar controller to generate tones, useful in the GPR system of FIG. 1C.

Reference is now made to FIG. 4, which illustrates the operation of radar controller 70 to generate tones. Radar controller 70 may synthesize tones to be transmitted, in accordance with a Step Frequency Continuous Wave (SFCW) technique. However, the SFCW approach implies transmitting and receiving simultaneously, which has the disadvantage that weak received signals may be suppressed by transmitter leakage.

To avoid this, radar controller 70 may additionally implement an interrupted continuous wave (ICW) technique, as discussed in U.S. Pat. No. 6,664,914, which is incorporated herein by reference, which may activate only one antenna 30 or 32 at a time or may limit the duration of time that both are simultaneously activated. Switching between antennas may isolate receiver antenna 32 while transmitter antenna 30 is active and vice versa. By combining the technique, into a "Step Frequency Interrupted Continuous Wave (SFICW)" technique, even weak tones may be received. Further, by alternating using the SFCW technique and the SFICW technique, most targets can be detected.

Accordingly, radar controller 70 may comprise a GPR SFCW tone transmitter 80, a GPR SFCW tone receiver 82, and a switcher 84.

When performing the SFICW technique, switcher 84 may alternately activate transmitter 80 and receiver 82 or may activate them such that they overlap minimally. GPR SFCW tone transmitter 80 may generate the tones typically, but not essentially, equi-spaced in frequency. Transmitter 80 may omit tones, generally when radar controller 70 detects interference, as described hereinbelow. The ability to omit tones may make GPR system 10 tolerant to interference and also may allow it to avoid interfering with other radio related systems. Transmitter 80 may provide the generated tones to transmit antenna 30 which may transmit them into trench 40. Receiver 82, when activated by switcher 84, may receive the reflected signals (e.g., radar echoes) and may provide the received signals to GPR pulse corrector 72. It will be appreciated that the timing of the switching may be designed to enable radar controller 70 to suppress the nearer and stronger echoes, leaving radar controller 70 able to receive weaker tones, which are typically from further away.

Before providing the tones to GPR pulse corrector 72, receiver 82 may check for interference. Specifically, the tones are allocated to specific frequencies at specific time slots. Thus, if the signal received in a specific slot does not have the expected frequency for that time slot, the received signal is not a tone. Instead, the received signal has interference therein and thus, receiver 82 may not pass that tone to GPR pulse corrector 72.

Applicant has realized that a conventional GPR system cannot come close to approximating an ideal pulse because of internal reflections which cannot be suppressed. For example, reflections within the antenna structure produce ringing which adversely affects resolution by spreading the pulse energy. Applicant has further realized that, by correcting the tones and thereby producing synthesized tones, these deleterious effects may be significantly suppressed.

To find the imperfections in the equipment, radar controller 70 may additionally comprise a tone calibrator 86, which may be a high-fidelity bypass link (e.g., a calibration path) connecting the end of the transmit path to the beginning of the receive path (such that the calibration signal never passes into the air; it only passes within the hardware). The resultant "radar" signal will only bear therein the practical distortions impressed by the transmit and receive hardware. Tone calibrator 86 may occasionally activate the calibration path and may store the resultant calibration signal.

Figure 5A:
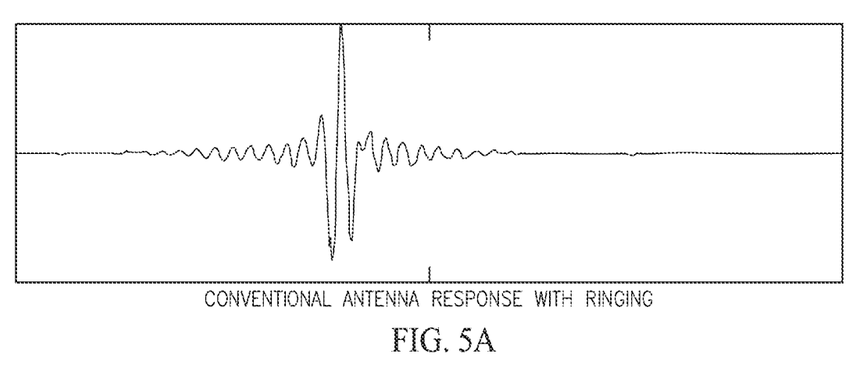
FIGS. 5A and 5B, respectively, illustrate a conventional antenna response and a digitally corrected antenna response.
Figure 5B:
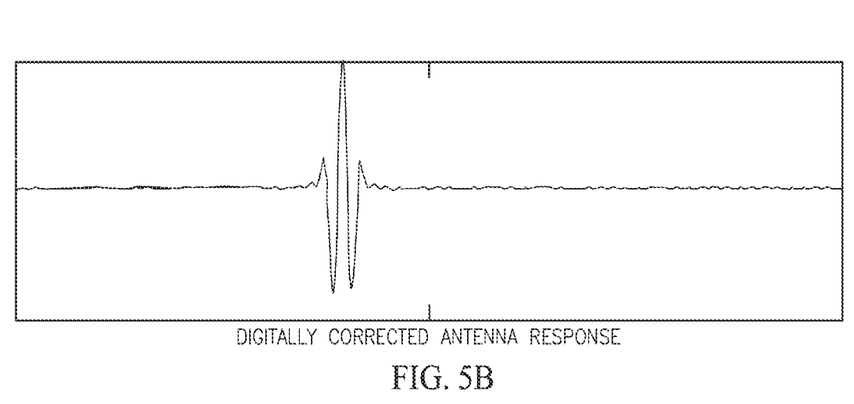

GPR pulse corrector 72 may use the resultant calibration tones to perform digital corrections on the individual received tones, using methods similar to those employed by a vector network analyzer, a common laboratory instrument. Since the relevant corrections are in the frequency domain and since the corrected tones form a Fourier series, GPR pulse corrector 72 may perform an inverse Fourier transform, a standard signal processing operation, on the corrected tones to convert them to a corrected pulse. Thus, GPR pulse corrector 72 may restore the fidelity of the received tones by individual digital correction of the tones. This is shown in FIGS. 5A and 5B, reference to which is now briefly made. FIGS. 5A and 5B, respectively illustrate a conventional antenna response and a digitally corrected antenna response, such as may be produced by GPR pulse corrector 72. As can be seen, the conventional antenna response of FIG. 5A has antenna ringing therein while the corrected response of FIG. 5B approaches the theoretical ideal, with little antenna ringing therein. It will be appreciated that GPR pulse corrector 72 may be implemented in a conventional signal processing unit.

Figure 6:
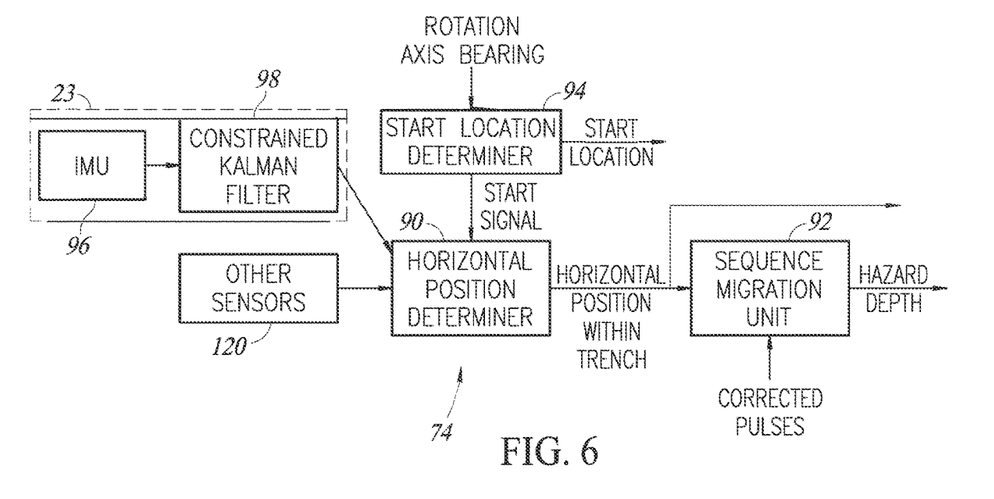
FIG. 6 is a block diagram illustration of a GPR data interpreter, useful in the GPR system of FIG. 1C.

Reference is now made to FIG. 6, which illustrates the elements of GPR data interpreter 74, which may process the sequence of pulses which are received during the approach and recession of the radar as it passes over buried utility 60. It will be appreciated that, before processing the pulses, the horizontal position of GPR unit 12 at each point of transmission may be determined so that the arrival instant of the pulses, which indicate the depth of buried utility 60, may be associated with their horizontal positions. Motion sensor unit 23 may be used to determine the horizontal positions and may trigger a new sequence of tone transmissions as a function of the horizontal motion of bucket 13. For example, motion sensor system 23 may trigger tone transmissions for every 1 cm of horizontal motion.

GPR data interpreter 74 may comprise a horizontal position determiner 90, which may receive horizontal position information from at least one of a variety of sensor systems, and a sequence migration unit 92, which may review the sequence of pulses to determine the depth of the hazard, such as buried utility 60. GPR data interpreter 74 may also comprise a start location determiner 94 to indicate when operator 17 begins digging the next layer of trench 40 and to store a horizontal position coordinate of the bucket position at the start of the dig.

Start location determiner 94 may receive a bearing of a rotation axis of digger 11 from a Hall effect compass on GPS 24 on digger 11. In addition, operator 17 may start the "draw" at a known extension of bucket 13. With this information, start location determiner 94 may determine the start location of the draw.

One motion sensor system 23 may comprise a 6 degree of freedom IMU 96 and a constrained Kalman filter 98, which, as mentioned hereinabove, may exploit the constrained motion of the machine linkage of boom 50 and stick 52 to reduce the inherent drift of the accelerometers of IMU 96. This is described in U.S. Pat. No. 11,085,170, owned by Applicant and incorporated herein by reference. The IMU typically has a gyroscope which, in this embodiment, may also provide an offset bearing for the scan of bucket 13.

IMU 96 may measure the motion of bucket 13 and may provide its output to constrained Kalman filter 98 which, in turn, may generate the location of bucket 13 at each time point. Note that, as mentioned hereinabove, operator 17 may ensure that bucket 13 move horizontally when digging each layer of trench 40.

When operator 17 brings bucket 13 to a stationary point prior to starting to dig the next layer, known as a "draw", start location determiner 94 may register the stationary point, as a start location and may then activate horizontal position determiner 90 to begin operation. Horizontal position determiner 90 may determine horizontal position relative to this zero or start point.

Sequence migration unit 92 may process the sequence of pulses received during the draw and may migrate the echo energy in the pulses to a point of maximum likelihood, indicating the location of the scattering object (i.e., buried utility 60). Sequence migration is known and is discussed in the book, *Exploration Seismology*, by Sheriff and Geldart, Cambridge University Press, ISBN 0-521-48626-4 (Lib. of Congress), after page 237.

Figure 7:
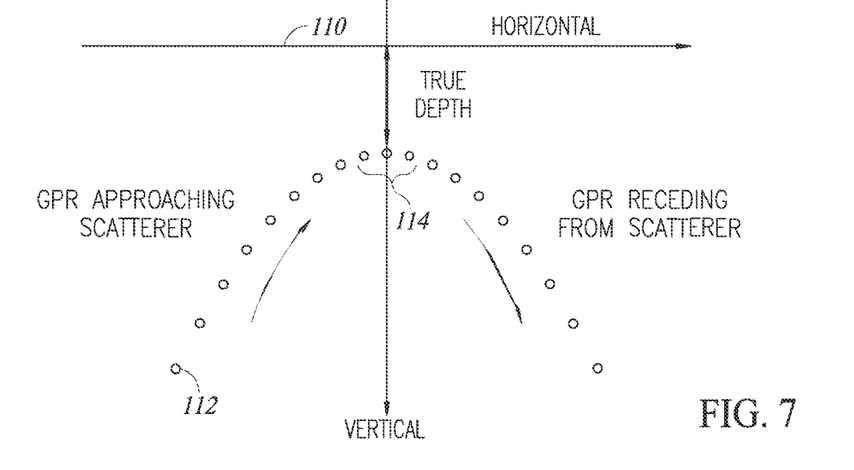
FIG. 7 is a schematic illustration of an exemplary scatter pattern of pulses during a draw of the digging machine.

Reference is now briefly made to FIG. 7, which illustrates an exemplary scatter pattern of pulses during the draw, as bucket 13 passes over buried utility 60. The dots show reported depths as bucket 13 moves horizontally within trench 40, indicated by horizontal line 110. As can be seen, a first dot, dot 112, is far from the horizontal line 110. As bucket 13 moves horizontally along trench 40, the dots approach horizontal line 110 and then move away from it. The dots at the peak, labelled 114, are the closest to horizontal line 110 and indicate the true depth of buried utility 60.

Migration unit 92 may continuously and automatically process the pulse data. Migration unit 92 may utilize a pattern recognition technique to determine one or more target x-z coordinates, where x is horizontal distance from the start of bucket motion and z is depth from horizontal. It will be appreciated that, by using a pattern recognition process, the resultant location and depth information may be more accurate, ideally eliminating the need for human intervention to check that buried utility 60 is where migration unit 92 determined it to be. It will further be appreciated that such accuracy may facilitate autonomous or semi-autonomous operation of digger 11. To this end, GPR system 10 may comprise at least one interface to receive control information from instrumentation for operator assistance or autonomous operation.

Figure 8:
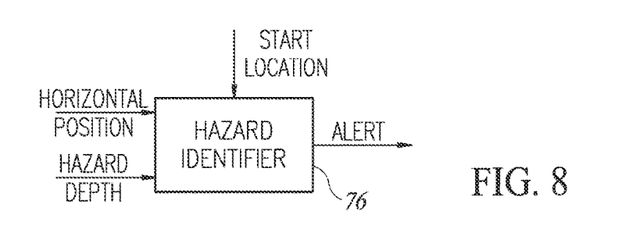
FIG. 8 is a block diagram illustration of a hazard identifier useful in the GPR system of FIG. 1C.

As shown in FIG. 8, to which reference is now briefly made, hazard identifier 76 may receive the horizontal position and hazard depth information generated by GPR data interpreter 74 and, when the information indicates a hazard, may provide the location and depth information to display 20 as well as activating an alert. In addition, hazard identifier 76 may instruct post-processor 14 (FIG. 1C) to activate a series of audible tones, using speaker 26. Machine operator 17 may assess if the hazard indicated will be encountered on the next scoop of the bucket or not and may react accordingly.

Returning to FIG. 6, there may be alternative methods of measuring the GPR motion (indicated as 'other sensors' 120 in FIG. 6) and of determining horizontal location therefrom. Horizontal position determiner 90 may combine their output with the output of IMU 96 and constrained Kalman filter 98 or may use them independently. While the IMU may be self-contained within GPR unit 12, the other methods may require more elaborate installation involving installing sensors on or external to the structure of digger 11.

Applicant has realized that inertial measurement requires a calibration, which requires a pause in digging action. Moreover, IMUs of the requisite quality are expensive. In an alternative embodiment, system 10 may utilize a "time of flight" distance measurement between a designated spot-on digger stick 52 (FIG. 1A) and known reference positions on cabin 19. This is shown in FIGS. 9A and 9B, to which reference is now made.

Figure 9A:
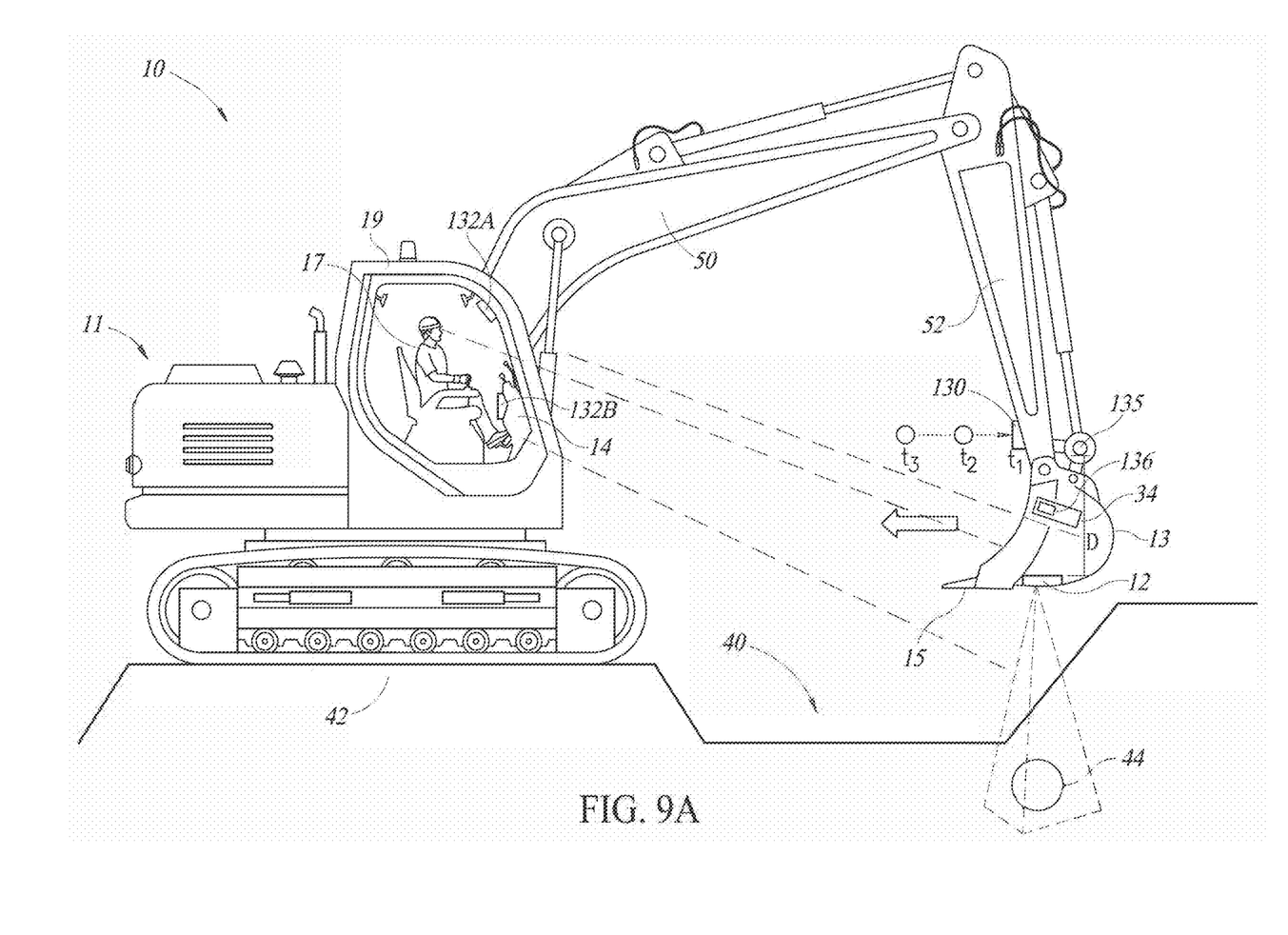
FIGS. 9A and 9B are schematic illustrations of an alternative GPR system operative during a digging operation with a digging machine.

FIG. 9A shows digger 11 with an emitter 130 mounted on digger stick 52 and multiple receiver units 133 (shown in FIG. 9B) mounted in cabin 19. For example, emitter 130 may be located relatively close to a bucket pivot 135 to provide relatively accurate position determination and there may be three or more receivers 133, where two receivers 133A and 133B may be formed into a receiver unit 132A mounted above the head of operator 17, such as on a bar running across the roof of cabin 19, with one mounted on the right and one on the left of cabin 19, and one receiver 133C may be formed into a receiver unit 132B close to the feet of operator 17, on the cabin centerline.

Figure 9B:
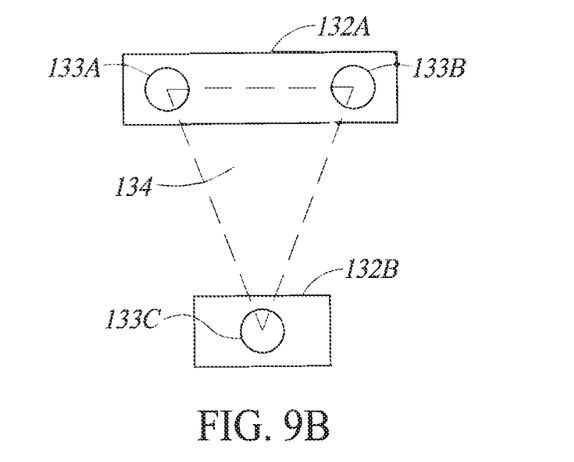

As can be seen in FIG. 9B, receivers 133 may form a triangle 134, which may be an equilateral triangle, with receivers 133A and 133B forming the base of triangle 134 in receiver unit 132A and receiver 133C forming the apex of triangle 134 in receiver unit 132B.

In this embodiment, emitter 130 may continuously transmit signals, such as at time $t_1$, $t_2$ and $t_3$ as shown in FIG. 9A. Receivers 133 may receive these signals and may provide their output to horizontal position determiner 90. Determiner 90 may use a time-of-flight calculation to determine the distance $d_i$ of emitter 130 as seen by each receiver 133, in a coordinate system defined by a fixed location on cabin 19.

Figure 9C:
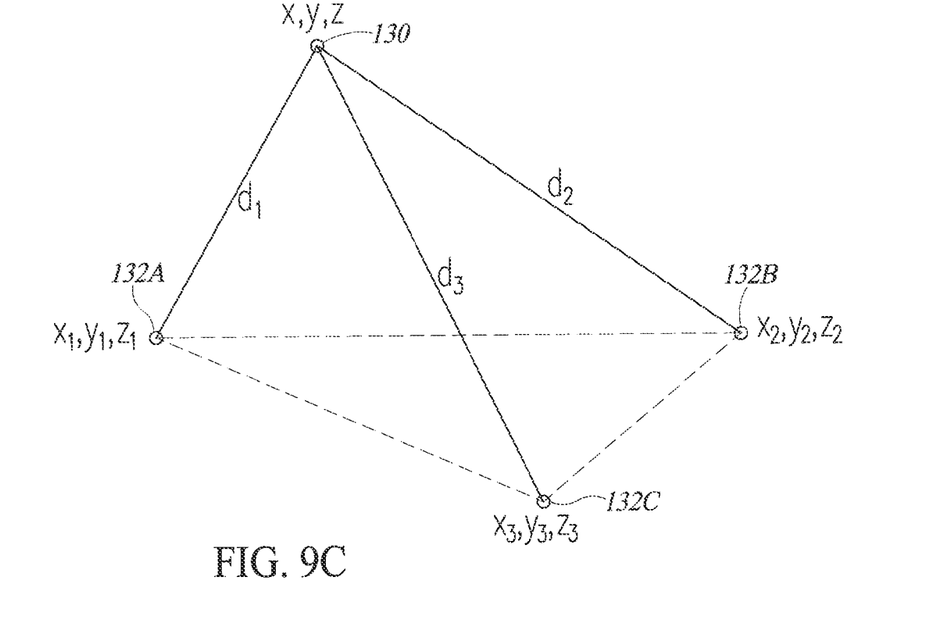
FIG. 9C is a schematic illustration of a triangulation operation performed by the system of FIG. 9A.

Determiner 90 may perform a conventional triangulation calculation from the distances $d_i$ measured by each receiver 133 to locate the position of emitter 130 on digger stick 52, expressed in the cabin-centered coordinate system. FIG. 9C, to which reference is now made, shows the triangulation operation to find the coordinates (x,y,z) of emitter 130. FIG. 9C shows distances $d_1$, $d_2$ and $d_3$, and coordinates $(x_1, y_1, z_1)$, $(x_2, y_2, z_2)$, and $(x_3, y_3, z_3)$ of receivers 133A, 133B and 133C, respectively. Determiner 90 may form three equations for the three unknowns (the coordinates x, y and z of emitter 130) as follows:

$$(d_i)^2 = (x-x_i)^2 + (y-y_i)^2 + (z-z_i)^2, \text{ for } i=1,2,3 \quad (1)$$

Using equation 1, determiner 90 may thus determine the coordinates of emitter 130 on digger stick 52. It will be appreciated that a vertical distance D between bucket pivot 135 and antennas 30/32 may be fixed, since operator 17 may maintain the floor of bucket 13 horizontal, such that determiner 90 may combine the coordinates of emitter 130 with fixed vertical distance D to determine the location of antennas 30/32. This may be true even when there is an angle between bucket 13 and digger stick 52 such that the effect of the known angle may be included in estimating the location of the antenna. The known angle may be measured by any suitable angle sensor, such as an inclinometer 136 within data processor 34 mounted in bucket 13. Inclinometer 136 may measure the deviation of bucket 13, and by inference of the bottom of bucket 13, from the horizontal.

It will be appreciated that the time-of-flight calculations and the triangulation calculations are simple and well-known and thus, determiner 90 may quickly determine the horizontal position of bucket 13.

It will be appreciated that, emitter 130 and receivers 133 of this embodiment are relatively low cost technologies. Moreover, since there is no need for calibration during operation and hence no pause, the operation is simpler than with IMU 96.

Emitter 130 and receivers 133 may be of any suitable technology, such as ultrasonics, UWB radar, millimeter wave radar, and optics. In all cases, the emitter is located at the designated point on stick 52 and the receivers are placed at reference position co-ordinates.

Determiner 90 may perform one-time calibration by measuring the errors in location of emitter 130 in known positions. Due to the short propagation distances involved, it is practical to expect a high signal to noise ratio at the receiving points. The signal resolution is given by propagation velocity divided by signal bandwidth and accuracy is proportional to resolution divided by the square-root of signal to noise ratio. In all cases, accuracy close to one centimeter is possible. There is a marginal advantage for ultrasonics in so much that the low propagation velocity of sound waves compared to electromagnetic waves eases requirements on bandwidth with impact on design and cost.

It will be appreciated that GPR system 10 may integrate detection within the action of digging and within the standard trench digging operation whereby the potential utility hazard is approached progressively during the removal of layers of soil. It will be appreciated that this progressive removal of soil may reduce requirements on penetration and detection depth, opening the application to a wider range of soil conditions.

Furthermore, GPR system 10 may achieve superior measurement quality by applying pulse synthesis techniques to enhance waveform fidelity, thereby correcting imperfections in the synthesis components at the level of transmitted individual frequency components in the Fourier spectrum of the pulse. This may result in improved resolution properties. Specifically, the correction technique may compensate for antenna deficiencies which are a major source of imperfections in conventional GPR systems. The aggregate of these improvements may be supplemented by an algorithmic approach to hazard detection which may reduce or eliminate the need for human interpretation, which may enable successful application of GPR detection in avoidance of utility damage. In this embodiment, operator 17 may be replaced by an automated digging control system to ensure that bucket 13 move horizontally at an optimal speed when digging each layer of trench 40.

GPR system 10 may eliminate the need for registration between survey and site and the need for human intelligence in interpretation of the GPR data. Furthermore, GPR system 10 may reduce the amount of operator training needed and may require no additional ability beyond the normal skills required for the operation of the digger 11.

It will further be appreciated that, since GPR unit 12 may be installed within the volume of a digging bucket, it may provide an installation which minimally compromises the digging efficiency of the bucket. Moreover, as discussed hereinabove, antennas 30 and 32 point earthwards while the bucket is scooping earth and hence, GPR system 10 may be oriented for detecting buried obstacles. Moreover, GPR system 10 may geo-locate the site of digging with the found object and may index the information in order to broadcast it to an external agent through WiFi.

It will further be appreciated that GPR system 10 may provide real-time (i.e., as you are digging) alerts to hazards below the surface.

Unless specifically stated otherwise, as apparent from the preceding discussions, it is appreciated that, throughout the specification, discussions utilizing terms such as "processing," "computing," "calculating," "determining," or the like, refer to the action and/or processes of a computing device of any type, such as a general or a specific purpose computer, such as a client/server system, mobile computing devices, tablet devices, smart appliances, cloud computing units, signal processing unit, or similar electronic computing devices that manipulate and/or transform data within the computing system's registers and/or memories into other data within the computing system's memories, registers or other such information storage, transmission or display devices.

Embodiments of the present invention may include apparatus for performing the operations herein. This apparatus may be specially constructed for the desired purposes, or it may comprise a computing device or system typically having at least one processor and at least one memory, selectively activated or reconfigured by a computer program stored in the computer. The resultant apparatus when instructed by software may turn the general-purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus. The computer readable storage medium may also be implemented in cloud storage.

Some general-purpose computers may comprise at least one communication element to enable communication with a data network and/or a mobile communications network.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A GPR (ground penetrating radar) system comprising:
a GPR unit mounted on a bucket of a digging machine, said GPR unit comprising at least one GPR antenna mounted on and/or through a ground facing base of said bucket and a data processor mounted within an upper portion of said bucket, said data processor to detect a presence of a hazard during a progressive removal of layers of soil; and
a post-processing unit installable in a cabin of said digging machine to provide an alert when said data processor detects said hazard during said progressive removal of layers of soil, wherein said data processor comprises a radar controller to transmit and receive pulses, which are sequences of tones in a frequency domain, in both a SFCW (stepped frequency continuous wave) manner and a SFICW (stepped frequency interrupted continuous wave) manner, wherein said data processor comprises a tone calibrator to determine antenna deficiencies, and wherein said data processor comprises a pulse corrector to individually correct imperfections in said tones using output of said tone calibrator.

2. The GPR system according to claim 1 said radar controller to alternately transmit and receive said pulses in said SFCW manner and in said SFICW manner.

3. The GPR system according to claim 1 wherein said data processor comprises a sequence migration unit receiving corrected pulses from said pulse corrector to migrate echo energy in said corrected pulses to a point of maximum likelihood indicating a location of said hazard.

4. The GPR system according to claim 1 wherein said at least one GPR antenna points earthwards while said bucket is scooping earth.

5. The GPR system according to claim 1 said tone calibrator to correct a ringing in said at least one GPR antenna.

6. The GPR system according to claim 1 wherein said data processor comprises an IMU (inertial measurement unit) and a Kalman filter, said Kalman filter to estimate horizontal location of said bucket using constrained motion of said bucket.

7. The GPR system according to claim 6 wherein said data processor comprises a start point determiner to establish a datum from which horizontal and vertical coordinates of a utility scatterer are measured.

8. The GPR system according to claim 1 wherein said alert is at least one of a displayed alert and an audible alert.

9. The GPR system according to claim 6 wherein said post-processing unit comprises a GPS unit to geo-locate a site of said digging machine and wherein said post-processing unit includes location data from said GPS unit in a log of said removal of layers of soil.

10. The GPR system according to claim 9 and also comprising a communications unit to relay a location of said hazard and said location data to an external agent.

11. The GPR system according to claim 1 and comprising at least one interface to receive control information from instrumentation for operator assistance or autonomous operation.

12. The GPR system according to claim 1 and also comprising:
an emitter mountable on a stick of said digging machine within a predetermined distance of a pivot between said stick and said bucket; and
multiple receivers mountable within said cabin to receive signals from said emitter;
said data processor to determine a horizontal position of said bucket at least from time-of-flight measurements between said emitter and said receivers.

13. The GPR system according to claim 12 wherein said emitter and said multiple receivers implement one of the following technologies: ultrasonics, UWB radar, millimeter wave radar, and optics.

14. The GPR system according to claim 12 and also comprising an inclinometer to measure an inclination of said bucket from horizontal, said data processor to utilize said inclination to determine said horizontal position.

15. A method for GPR (ground penetrating radar) systems, the method comprising: detecting a presence of a hazard during a progressive removal of layers of soil using a GPR unit mounted on a bucket of a digging machine, said GPR unit comprising at least one GPR antenna mounted on and/or through a ground facing base of said bucket and a data processor mounted within an upper portion of said bucket; and providing an alert by a post-processing unit installed installable in a cabin of said digging machine when said data processor detects said hazard during said progressive removal of layers of soil, wherein said detecting comprises transmitting and receiving pulses which are sequences of tones in a frequency domain, in both a SFCW (stepped frequency continuous wave) manner and a SFICW (stepped frequency interrupted continuous wave) manner, and wherein said detecting comprises determining antenna deficiencies, and individually correcting imperfections in said tones using output of said determining.

16. The method according to claim 15 and wherein said detecting comprises alternately transmitting and receiving said pulses in said SFCW (stepped frequency continuous wave) manner and in said SFICW (stepped frequency interrupted continuous wave) manner.

17. The method according to claim 15 wherein said detecting comprises receiving corrected pulses and migrating echo energy in said corrected pulses to a point of maximum likelihood indicating a location of said hazard.

18. The method according to claim 15 and also comprising pointing said at least one GPR antenna earthwards while said bucket is scooping earth.

19. The method according to claim 15 said determining includes correcting a ringing in said at least one GPR antenna.

20. The method according to claim 15 wherein said detecting comprises estimating horizontal location of said bucket with a Kalman filter using constrained motion of said bucket and output of an IMU (inertial measurement unit).

21. The method according to claim 20 wherein said detecting comprises establishing a datum from which horizontal and vertical coordinates of a utility scatterer are measured.

22. The method according to claim 15 wherein said alert is at least one of a displayed alert and an audible alert.

23. The method according to claim 20 and also comprising geo-locating a site of said digging machine and including location data from said geo-locating in a log of said removal of layers of soil.

24. The method according to claim 23 and also comprising relaying a location of said hazard and said location data to an external agent.

25. The method according to claim 15 and comprising receiving control information from instrumentation for operator assistance or autonomous operation.

26. The method according to claim 15 and wherein said detecting comprises:

determining a horizontal position of said bucket at least from time-of-flight measurements between an emitter mounted on a stick of said digging machine within a predetermined distance of a pivot between said stick and said bucket and multiple receivers mounted within said cabin receiving signals from said emitter.

27. The method according to claim 26 wherein said emitter and said multiple receivers implement one of the following technologies: ultrasonics, UWB radar, millimeter wave radar, and optics.

28. The method according to claim 26 and also comprising measuring an inclination of said bucket from horizontal, said detecting to utilize said inclination to determine said horizontal position.

\* \* \* \* \*